(12) United States Patent
Töpfer

(10) Patent No.: US 6,875,100 B2
(45) Date of Patent: Apr. 5, 2005

(54) THREADING DEVICE FOR TUBULAR PACKAGINGS

(75) Inventor: Klaus Töpfer, Büttelborn (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/701,300

(22) Filed: Nov. 4, 2003

(65) Prior Publication Data

US 2004/0092221 A1 May 13, 2004

(30) Foreign Application Priority Data

Nov. 6, 2002 (DE) .......................................... 102 51 596

(51) Int. Cl.[7] .......................... A22C 11/02; B65B 43/42
(52) U.S. Cl. ........................................... 452/40; 53/576
(58) Field of Search ............................... 452/30–32, 35, 452/37, 40, 41, 46, 51; 53/567, 576

(56) References Cited

U.S. PATENT DOCUMENTS

| | | | | |
|---|---|---|---|---|
| 3,570,045 A | * | 3/1971 | Matecki ...................... | 493/308 |
| 3,950,821 A | * | 4/1976 | Plewa .......................... | 452/34 |
| 4,612,684 A | * | 9/1986 | Kollross ...................... | 452/35 |
| 5,100,364 A | * | 3/1992 | Kollross et al. ............ | 452/185 |
| 5,109,648 A | * | 5/1992 | Evans ........................ | 53/134.1 |
| 5,238,444 A | * | 8/1993 | Schwimmer et al. ......... | 452/48 |
| 5,755,022 A | * | 5/1998 | Whittlesey .................... | 29/788 |
| 5,813,907 A | | 9/1998 | Lebsack et al. ................ | 452/32 |
| 6,139,416 A | | 10/2000 | Töpfer .......................... | 452/31 |

FOREIGN PATENT DOCUMENTS

| | | |
|---|---|---|
| DE | 23 43 103 C3 | 11/1981 |
| DE | 33 05 362 C2 | 3/1986 |
| EP | 0 962 143 A1 | 12/1999 ........... A22C/11/02 |

* cited by examiner

*Primary Examiner*—Thomas Price
(74) *Attorney, Agent, or Firm*—Norris McLaughlin & Marcus PA

(57) ABSTRACT

Device for pulling the front end of a feed (4) of tubular packaging (casing) from the filling tube (2) of an apportioning filling machine for paste-like filling goods through the casing brake (5) and the closing device (11), having a pull-through rod (24) for the front end (4a) of the casing which can be hung in a clamping hook (26) on the free end of the rod. The pull-through rod (24) is bent in a semicircular shape and allows for swiveling on the closing device (11) about an axis (23) passing through the circular center point and running perpendicular to the filling tube axis (2a). The swivel axis (23) of the pull-through rod is laterally offset with respect to the filling tube axis (2a), and the closing device (11) can be laterally offset by approximately the same degree with respect to the filling tube (2), from a working position in which the center axis (11a) of the closing device (11) is coaxially aligned with the axis (2a) of the filling tube (2).

6 Claims, 4 Drawing Sheets

THREADING DEVICE FOR TUBULAR PACKAGINGS

BACKGROUND OF THE INVENTION

The invention relates to a device for pulling the front end of a feed of tubular casing through the casing brake and the closing device, situated in a housing, for an apportioning filling machine for paste-like filling goods, having a filling tube which contains the casing feed, the casing brake being positioned so that it can be pulled away from the orifice of the filling tube, and having a pull-through rod for the front end of the casing which can be hung in a clamping hook on the free end of the rod, the pull-through rod being movable from a working position, in which it passes through the casing brake and closing device and in which the clamping hook is located near the orifice of the filling tube, to an idle position in which the pull-through rod is swiveled out with the clamping hook.

Such a threading device for tubular packagings is known from DE 33 05 362 C2. As described therein, the piston rod of a lifting device which can be swung from a swiveled-out idle position to a working position which is coaxial with the filling tube has a gripping hook on its free end, and can be extended toward the filling tube through the closing device and the casing brake. The front end of the casing feed ("pleated casing") which is pushed accordion-style onto the filling tube can then be hung in the hook of the pull-through rod, fastened there, and pulled through the casing brake and the closing device by pulling the piston rod back.

The casing pull-through device known from DE 23 43 103 also operates using a hook situated on the free end of a slightly curved pull-through rod. As described therein, two levers linked by multiple rods are provided, on the one end the casing brake being attached so that it can be swiveled out from the filling tube, and on the other end the pull-through rod being fastened, and both are swiveled in, together or optionally toward the filling tube from the side. A closing device is not provided.

These known devices can no longer meet the demands for speed and reliability for introducing and passing the front end of casing feeds through the casing brake and a subsequent closing device, taking into consideration that for the high speed of modern automatic filling and apportioning machines, changing out the casing feed on the filling tube represents a significant additional time factor with a corresponding impairment of efficiency. The object of the invention, therefore, is to obviate this disadvantage.

SUMMARY OF THE INVENTION

Based on a device of the aforementioned design, the invention provides that the pull-through rod is bent in a semicircular shape and allows for swiveling on the closing device about an axis passing through the circular center point and running perpendicular to the filling tube axis. This design makes use of the fact that a simple rotational motion can be performed more readily and quickly than a longitudinal motion, even when combined with swiveling motions, as is the case with multi-articulated designs. Because the casing brake must be pulled away from the filling tube toward the closing device during the threading operation (and also when pushing fresh casing feed onto the filling tube),the path in the direction of the longitudinal axis of filling to be covered by the pull-through rod is relatively short, so that the circular curvature of the pull-through rod is not a problem with regard to the larger pass-through cross section. The pull-through rod preferably has a semicircular shape and can be swiveled over a range of 180°.

To simultaneously simplify introduction of fresh casing feed onto the filling tube, the system is preferably designed so that the swivel axis of the pull-through rod is laterally offset with respect to the filling tube axis, and the device housing can be laterally offset by approximately the same degree with respect to the filling tube, from a working position in which the center axis of the closing device is coaxially aligned with the axis of the filling tube. This can be achieved so that the housing for the closing device can be laterally (or also upwardly or downwardly) swiveled with respect to the filling tube in such a way that in the swiveled-out state the orifice of the filling tube is offset by the same degree with respect to the housing. The free end of the pull-through rod, which is rotated into its working position, is then situated with its clamping hook in front of the end of the filling tube, and thus in front of the beginning of the fresh casing feed. The front end of the casing feed is hung in the clamping hook of the pull-through rod, and when the housing for the closing device is swiveled back into the position in which the casing brake and closing device are coaxial with the filling tube, the pull-through rod swings back to its idle position, thereby pulling the front end of the casing through the casing brake and the closing device.

Additional advantageous refinements are the subject of corresponding subclaims, the control measures and processing of the front end of the casing after it is introduced and passed through the casing brake and closing device being of particular importance.

BRIEF DESCRIPTION OF THE DRAWINGS

The exemplary embodiment of the invention is described below, with reference to the drawings.

The filling machine, which is indicated only on its front side 1, has a conventional filling tube 2 which is attached to the filling machine by a screw connection 3.

Figure 1:
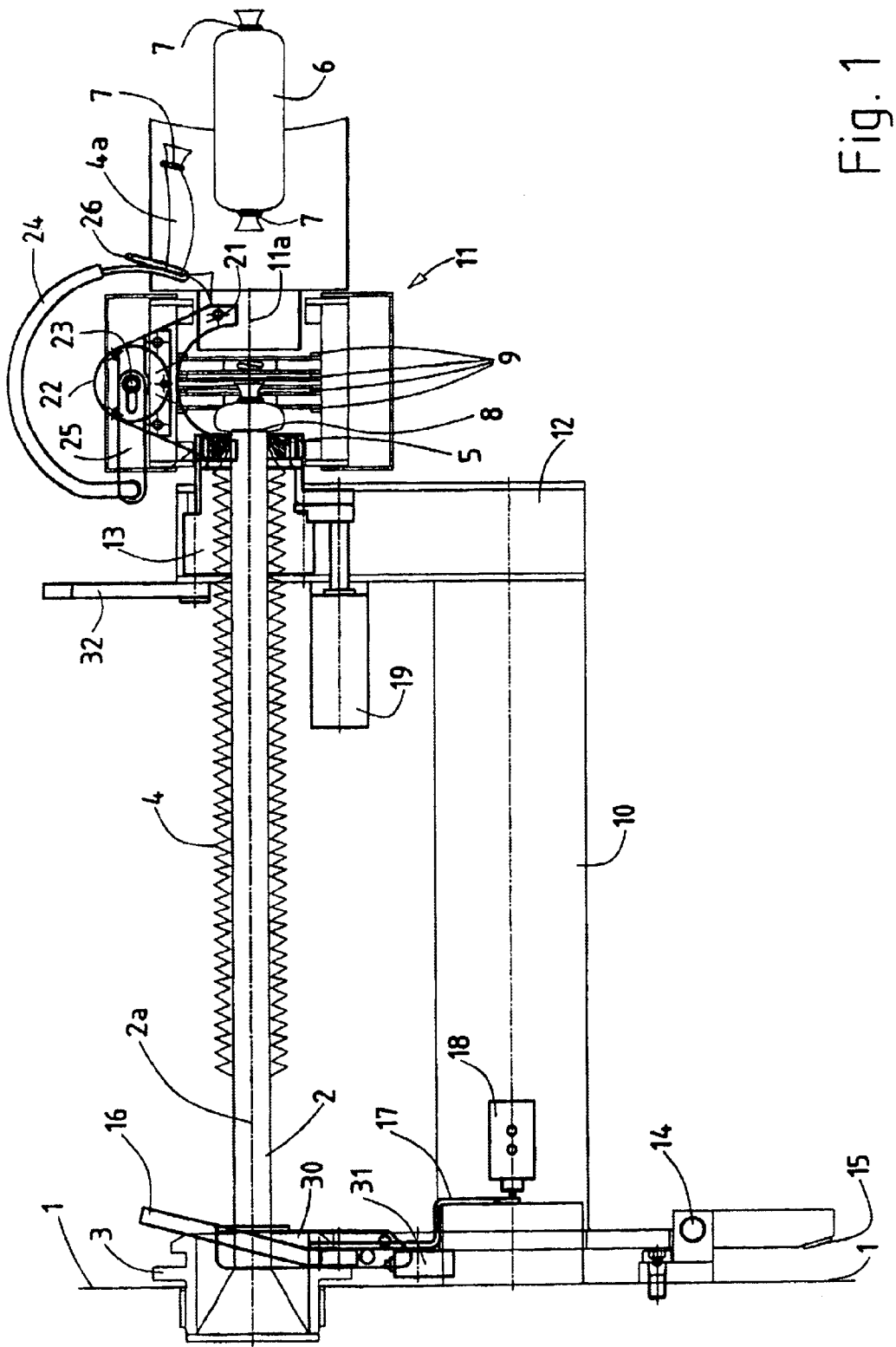
FIG. 1 shows in a schematic top view the closing device on a track, connected to its filling tube, together with the inventive threading device for tubular packagings in its idle position during filling.

Stock feed of tubular casing folded in an accordion-like manner in the shape of a pleated casing 4 is pushed onto the exterior of filling tube 2. During filling, the tubular material is pulled through casing brake 5 when the respective front side has been closed off, and the filling goods are ejected through the filling tube into the packaging material (casing). When the filling procedure has completed a portion, the wrapping for the portion is also closed on the other end. FIG. 1 shows such a portion in the form of a sausage 6 with clip closures on both ends.

Parallel to filling tube 2, an arm 10 is attached to front side 1 of the filling machine which bears the closing device, designated overall by reference number 11, by means of a crossbeam 12 which also accommodates mounting 13 for casing brake 5 together with the actuating device of same, as described in greater detail below. In the position shown in FIG. 1, central axis 11a of closing device 11 is aligned with axis 2a of filling tube 2.

Arm 10 is mounted so as to be pivotable about axis 14 on front side 1 of the filling machine, a stop 15 limiting the angle of swivel. An actuating lever 16 is situated on the side of arm 10 opposite swivel axis 14.

Figure 2:
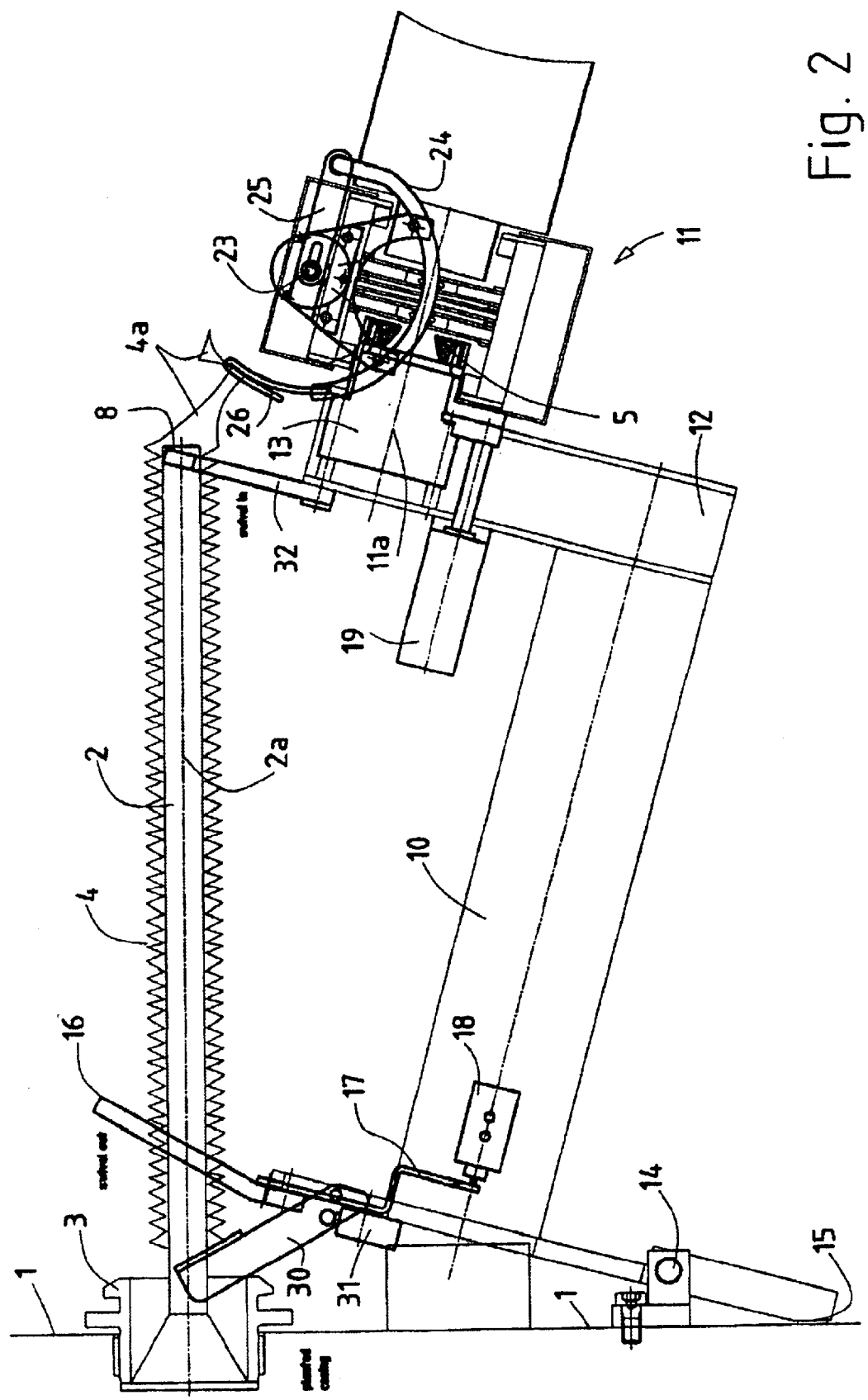
FIG. 2 shows an illustration corresponding to FIG. 1 for changing out the pleated casing and threading the front end of the casing.
Figure 3:
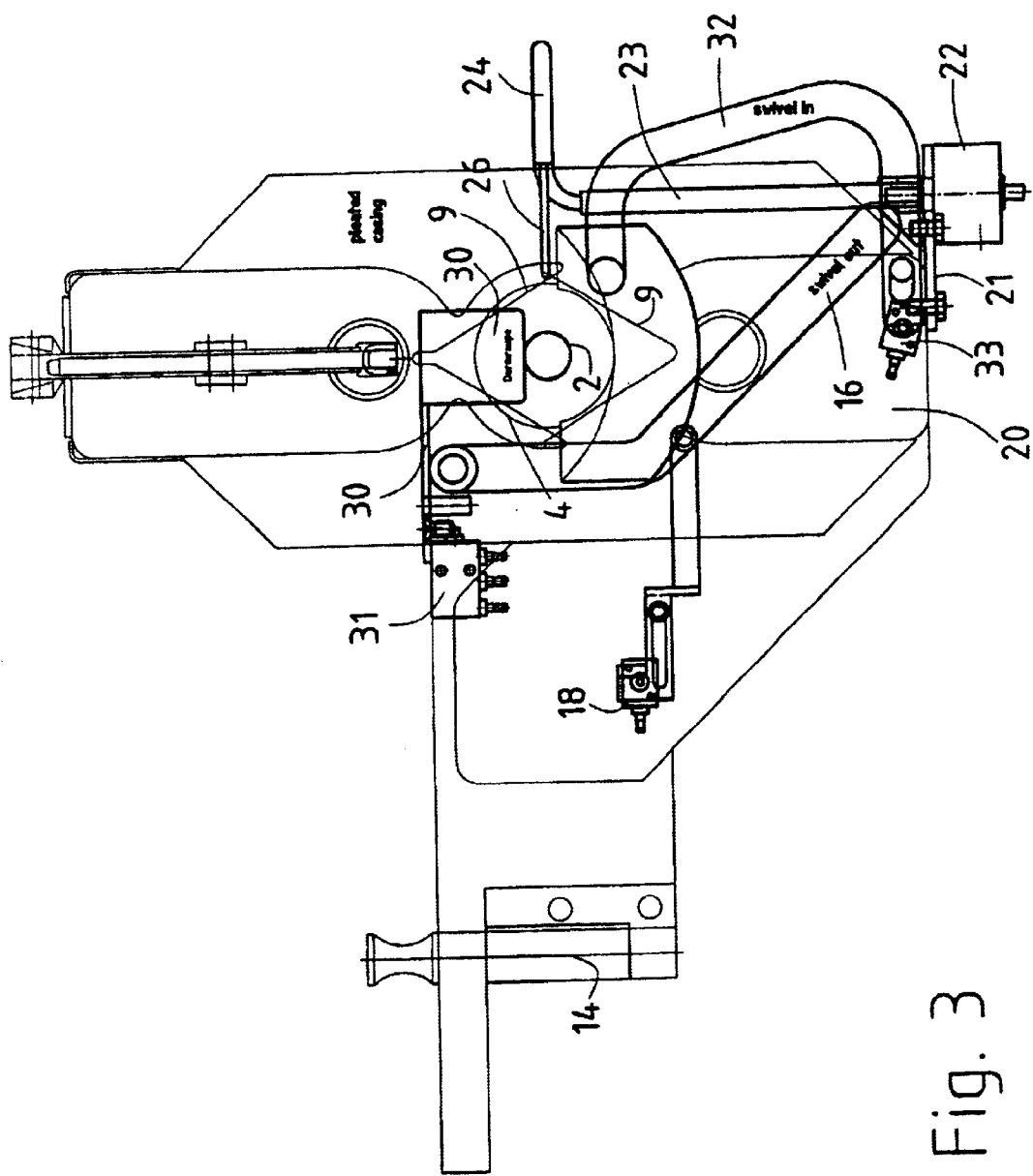
FIG. 3 shows a front view of the system in FIG. 1.

When the actuating lever is pressed sideways, arm 10 together with closing device 11 fastened thereto swivels into the swiveled-out position illustrated in FIG. 2. At the same time that actuating lever 16 is released from the position shown in FIG. 1 when the swivel-out motion begins, a pneumatic valve 18 is switched on via rod 17, and with the assistance of pneumatic cylinder 19 pushes casing brake 5 from orifice 8 of filling tube 2 toward displacement plates 9 in closing device 11; otherwise, it would not be possible for the casing brake to swivel out to the position shown in FIG. 2.

On the underside of housing 20 of closing device 11 is mounted by means of a forked support 21 a pneumatically actuated swivel cylinder 22 for swivel axis 23 of essentially semicircular pull-through rod 24 of the casing threading device. Pull-through rod 24 is attached on its one end, using a bracket 25, to axis 23 passing through the circular center point, while the other end is bent to form a gripping hook 26 or is provided with same.

When, after a pleated casing 4 is processed, the closing device swivels out of the filling position according to FIG. 1 into the casing changeout position according to FIG. 2 when casing brake 5 is applied, and casing residue still present is withdrawn from closing device 11 and a fresh pleated casing is pushed onto exposed filling tube 2, the machine-side end of the pleated casing presses against an actuating lever 30 of a pneumatic valve 31 which is released during the swivel-out motion as shown in FIG. 2, whereupon pneumatic cylinder 22 is acted on by compressed air, and pull-through rod 24 together with hook 26 for the threading device swivel over approximately 180° about axis 23, from the idle position according to FIG. 1 into the working position according to FIG. 2. In this position, front end 4a of pleated casing 4 situated in the region of orifice 8 of filling tube 2 can be hung into gripping hook 26 of pull-through rod 24 and clamped there, as illustrated in FIG. 2. The lateral offset of axis 23 with respect to axis 11a corresponds approximately to the offset of axis 23 maintained with respect to axis 2a of filling tube 2 in the swiveled-out state of the closing device, so that the position of gripping hook 26 illustrated in FIG. 2 is located near orifice 8 of the filling tube.

At this point, return swiveling of arm 10 together with the units attached thereto can be initiated by pressure on an additional actuating lever 32 mounted on closing device 11. An additional pneumatic valve 33 is thereby actuated, and swivels pull-through rod 24 from its position passing through the central opening of displacement plates 9 and through casing brake 5, as shown in FIG. 2, back to its idle position as shown in FIG. 1. Pull-through rod 24 together with its gripping hook 26 carries front end of casing 4a and threads it through casing brake 5 and closing device 11, enabling the filling process to restart and continue after the first clip is placed and the front end of casing 4a clamped in gripping hook 26 is cut off, after casing brake 5 has been pushed onto filling tube 2 with the assistance of pneumatic cylinder 19. At the same time, lever 30 has been pressed against retaining nut 3 of filling tube 2 (FIG. 1), thereby preventing pneumatic valve 18, and thus pneumatic cylinder 22 for the threading device, from being unintentionally actuated.

Figure 4:
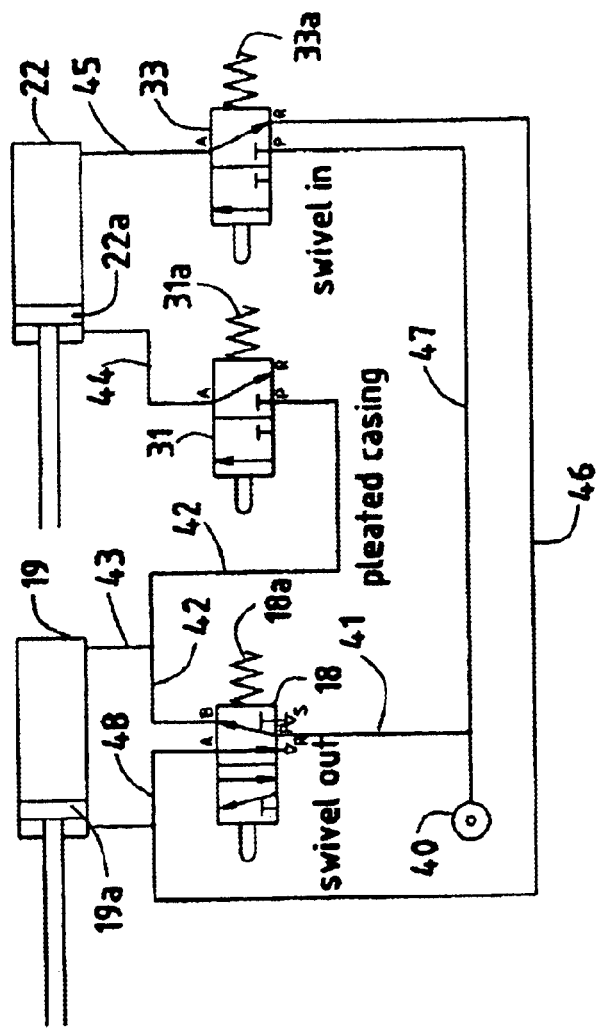
FIG. 4 shows a schematic diagram of the pneumatic controls.

FIG. 4 illustrates the above-described pneumatic control by means of a schematic flow diagram. The drawing shows the position of the pneumatic cylinders and pneumatic valves after arm 10 together with closing device 11 swivels out, before a fresh pleated casing 4 is pulled onto filling tube 2. Before the swivel-out motion occurs, assisted by actuating lever 16, compressed air from compressed air source 40 has been supplied via line 41 through valve 18 over length P-B and lines 42, 43 to the right side of piston 19a of pneumatic cylinder 19, so that said piston is brought into the illustrated left end position in which casing brake 5 has been disengaged from filling tube 2 into the position shown in FIG. 2 and held there. Compressed air is also applied to pneumatic valve 31 via line 42, and when said pneumatic valve is displaced from the illustrated idle position, against the force of spring 31a, to the right into its working position because pleated casing 4 presses against actuating lever 30 and valve 31 is moved to the right, the compressed air reaches the left side of piston 22a in pneumatic cylinder 22 via line 44. Swivel axis 23 of the threading device is thus rotated and the pull-through rod is swiveled from its idle position, in which gripping hook 26 is situated on the discharge side of closing device 11, through the closing device and casing brake 5 in the vicinity of orifice 8 of filling tube 2; line 45, path A-R of pneumatic valve 33, and line 46 and path A-R in pneumatic valve 18 on the right side of pneumatic cylinder 22 are evacuated.

When actuating lever 32 used for the swivel-in motion is subsequently pressed, pneumatic valve 33 is displaced by this pressure from its position illustrated in FIG. 4, against the force of spring 33a, to the right. This causes compressed air to pass from compressed air source 40 via line 47 and path P-A in pneumatic valve 33 to line 45, and moves piston 22a in pneumatic cylinder 22 to the left once again, so that pull-through rod 24 in the casing threading device returns to its initial idle position, and pulls front end of casing 4a through casing brake 5 and closing device 11. As soon as the swivel-in motion has ended and the position illustrated in FIG. 1 has been restored, pneumatic valve 18 is pushed against the force of spring 18a into its right position (not illustrated in FIG. 4), so that compressed air passes via line 41, path P-A in pneumatic valve 18, and through line 48 to the left side of piston 19a, and the displacement of said piston to the right returns the casing brake to filling tube 2. At the same time, the compressed air present in line 48 is passed through line 46 and path R-A of valve 33 to the right side of cylinder 22, and locks piston 22a for the cylinder into the position illustrated in FIG. 4, in which gripping hook 26 is situated on the discharge side of closing device 11 (FIG. 1) due to the fact that pneumatic valve 33 returns to its idle position illustrated in FIG. 4 by the force of spring 33a when actuating lever 32 used for the swivel-in motion is released.

I claim:

1. Device for pulling a front end of a tubular casing from a filling tube of an apportioning filling machine, over which said casing is placed, away from an orifice of said filling tube and through a casing brake and closing elements of said filling machine, said device comprising a pull-through rod having a clamping hook on one end thereof for clamping said front end of said casing, said pull-through rod having a semicircular shape and being swivelable about an axis which is perpendicular to the axis of said filling tube, from a first position, in which it passes through the casing brake and closing device and in which position said clamping hook on said one end of said pull-through rod is located proximate said orifice of said filling tube, to a second position in which the pull-through rod is swiveled and said clamping hook is moved away from said orifice and through said casing brake and closing device.

2. Device according to claim 1, wherein said pull-through rod is swivelable over a range of at least approximately 180°.

3. Device according to claim 1 or 2, wherein the swivel axis of said pull-through rod is laterally offset with respect to the axis of the filling tube, and said closing elements are laterally displaceable by approximately the same degree as said lateral offset of said swivel axis of said pull-through rod, with respect to said filling tube, from a working position in which the center axis of said closing elements is coaxially aligned with said axis of said filling tube.

4. Device according to claim 3, wherein actuation of the displacement of the closing elements initiates axial displacement of the casing brake away from the filling tube, the displacement of the casing brake taking place prior to the displacement of the closing elements.

5. Device according to claim 3, wherein the return of the pull-through rod (24) to said second position is coupled with the return of the closing elements to the position they occupied prior to said displacement.

6. Device according to claim 4, wherein the return of the pull-through rod (24) to said second position is coupled with the return of the closing elements to the position they occupied prior to said displacement.

* * * * *

UNITED STATES PATENT AND TRADEMARK OFFICE
CERTIFICATE OF CORRECTION

PATENT NO. : 6,875,100 B2  
DATED : April 5, 2005  
INVENTOR(S) : Topfer

It is certified that error appears in the above-identified patent and that said Letters Patent is hereby corrected as shown below:

Column 1,
Line 64, "tube),the" should read -- tube), the --.

Column 4,
Line 57, "for damping" should read -- for clamping --.

Column 6,
Line 11, "prior to said displacement" should read -- prior to displacement --.

Signed and Sealed this

Thirtieth Day of May, 2006

JON W. DUDAS
*Director of the United States Patent and Trademark Office*